United States Patent
Carter et al.

(10) Patent No.: US 8,677,162 B2
(45) Date of Patent: Mar. 18, 2014

(54) RELIABILITY-AWARE DISK POWER MANAGEMENT

(75) Inventors: John B. Carter, Austin, TX (US); Wesley M. Felter, Austin, TX (US); Anthony N. Hylick, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 12/962,477

(22) Filed: Dec. 7, 2010

(65) Prior Publication Data

US 2012/0140355 A1  Jun. 7, 2012

(51) Int. Cl.
 G06F 1/26 (2006.01)
 G06F 1/32 (2006.01)

(52) U.S. Cl.
 USPC ............. 713/320; 713/300; 713/323; 360/69; 360/110; 360/240

(58) Field of Classification Search
 USPC ............. 713/300, 320, 323; 360/69, 110, 240
 See application file for complete search history.

(56) References Cited

U.S. PATENT DOCUMENTS

| | | | |
|---|---|---|---|
| 5,961,613 A | 10/1999 | DeNicola | |
| 6,925,529 B2 | 8/2005 | Bohrer et al. | |
| 7,120,806 B1 * | 10/2006 | Codilian et al. | 713/320 |
| 7,283,319 B2 | 10/2007 | Hobbet et al. | |
| 7,425,810 B2 | 9/2008 | Hobbet et al. | |
| 7,516,348 B1 * | 4/2009 | Ofer | 713/324 |
| 2002/0144057 A1 | 10/2002 | Li et al. | |
| 2004/0015731 A1 | 1/2004 | Chu et al. | |
| 2006/0274445 A1 * | 12/2006 | Hobbet et al. | 360/75 |
| 2007/0061509 A1 | 3/2007 | Ahluwalia et al. | |
| 2008/0172567 A1 | 7/2008 | Zhang et al. | |
| 2008/0276043 A1 | 11/2008 | Hetzler et al. | |
| 2009/0006877 A1 | 1/2009 | Lubbers et al. | |
| 2009/0177837 A1 | 7/2009 | Kaneda | |
| 2009/0265568 A1 | 10/2009 | Jackson | |
| 2009/0303632 A1 | 12/2009 | Bougaev et al. | |
| 2010/0083017 A1 | 4/2010 | Fulkerson et al. | |

FOREIGN PATENT DOCUMENTS

| | | | |
|---|---|---|---|
| JP | 2007257577 A1 | 3/2006 | |
| WO | WO03065360 A1 | 8/2003 | |

OTHER PUBLICATIONS

Timothy Bisson et al., "A Hybrid Disk-Aware Spin-Down Algorithm with I/O Subsystem Support", 2007.

* cited by examiner

*Primary Examiner* — Kim Huynh
*Assistant Examiner* — Michael J Brown
(74) *Attorney, Agent, or Firm* — Brevetto Law Group

(57) ABSTRACT

A token value is maintained based on an allowable number of low power transitions of a hard disk drive without adversely affecting reliability, compared to an actual number of low power transitions of said hard disk drive. The allowable number of low power transitions increases over the hard disk drive's lifetime. Before the hard disk drive performs a low power transition, the token is evaluated to determine if the hard disk drive is allowed to perform a low power transition. Low power transitions discussed include parking the head and spinning-down the hard disk drive.

14 Claims, 4 Drawing Sheets

RELIABILITY-AWARE DISK POWER MANAGEMENT

BACKGROUND

1. Field of the Invention

The present subject matter relates to hard disk drives, and more specifically, to managing power of hard disk drives.

2. Description of Related Art

Many computer systems utilize hard disk drives for data storage. Typical hard disk drives today utilize one or more disks coaxially arranged and spun utilizing an electric motor. Data may be written and read using a magnetic head for each disk that "flies" very close to each disk. Data is written by using the heads to magnetize small regions of the disks to a particular polarization and read by using the heads to detect the polarization of each region. The heads are typically driven by an actuator, such as a voice coil actuator, to position the heads the desired distance from the axle of the disks, allowing many different concentric rings of data to be created on each disk. The motor, actuator and magnetic heads may be controlled by a disk controller which also may provide a disk interface that may be used by the computer system to access and control the hard disk drive. The entire hard disk drive may be enclosed in a housing with power and disk interface connections exposed to allow interconnection to the rest of the computer system.

Many computer systems, including servers, desktop and portable computers, may operate in a power saving mode in order to reduce power consumption, both to save on operating costs, as well as for the good of the environment. Some aspects of power saving may be controlled from within the operating system using techniques such as those specified in the Advanced Configuration and Power Interface (ACPI) specification. Other aspects may be managed directly by individual devices. Yet other aspects may be managed explicitly by an application.

Hard disk drives may be a major consumer of power in many computer systems, especially for computer systems such as servers that may utilize a large number of hard disk drives. A hard disk drive may provide one or more low power states of operation. Some of the low power states may turn off the motor that spins the disks as one way of saving power as the motor may be a large portion of the power consumed by the hard disk drive.

SUMMARY

Various embodiments are disclosed for managing power consumed by a hard disk drive include maintaining a token value based on an allowable number of low power transitions of a hard disk drive compared to an actual number of low power transitions of the hard disk drive. The allowable number of low power transitions increases over the hard disk drive's lifetime. Once it is determined that the hard disk drive should be put into a low power state to conserve power, the token value is evaluated to determine if the hard disk drive is allowed to perform a low power transition. The low power transition of the hard disk drive is performed if the token value evaluates to allow the low power transition of the hard disk drive. Other embodiments include hard disk drives and systems implementing aspects of managing power consumed by a hard disk drive.

BRIEF DESCRIPTION OF THE SEVERAL VIEWS OF THE DRAWINGS

The accompanying drawings, which are incorporated in and constitute part of the specification, illustrate various embodiments of the invention. Together with the general description, the drawings serve to explain the principles of the various embodiments. In the drawings.

DETAILED DESCRIPTION

Figure 1A:
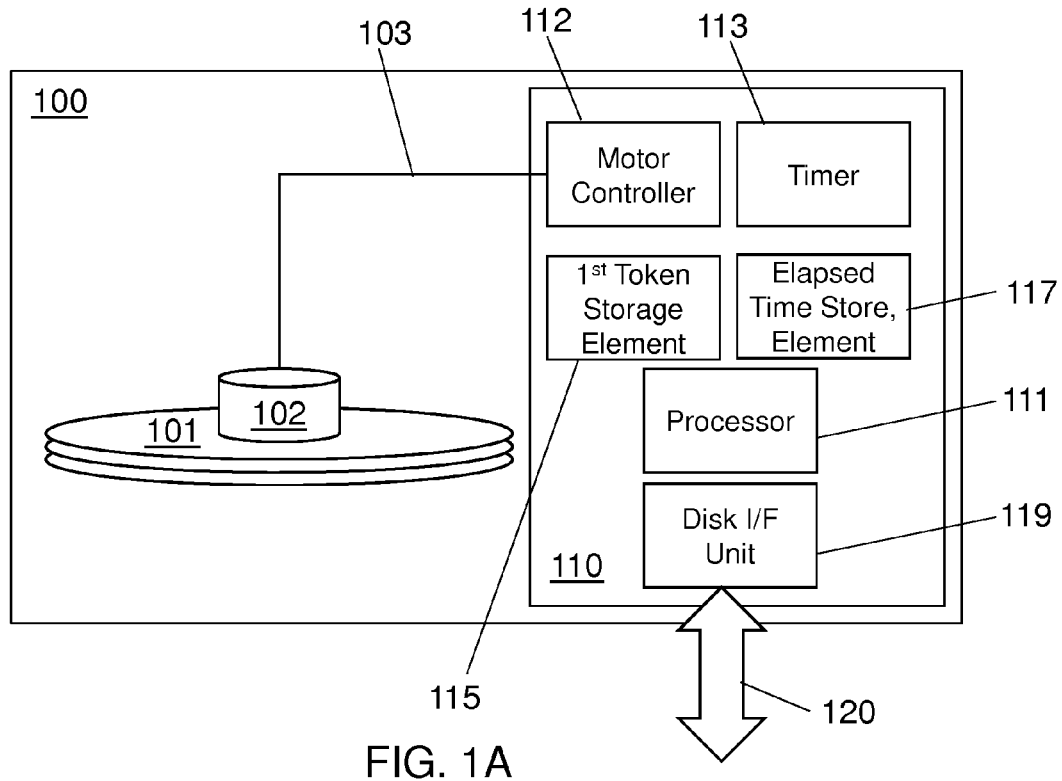
FIG. 1A-B show block diagrams of various aspects of a hard disk drive suitable for various embodiments of managing power.

In the following detailed description, numerous specific details are set forth by way of examples in order to provide a thorough understanding of various embodiments. However, it should be apparent to those skilled in the art that the embodiments of the present disclosure may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

"Head Parking" (or "parking heads" or "parking the heads") refers to moving the heads of a hard disk drive to a location away from the surface area of the disks. This may be done to eliminate the chance of damage to the rotating disks that may be caused by physical contact between the heads and the disks. This may also be done to reduce the amount of power consumed by the voice coil actuator. In some embodiments, the head(s) may be positioned on a ramp(s) to move them away from the surface area of the disks.

"Spin-down" refers to the process of turning off the motor that spins the disks of the hard disk drive. In some embodiments, the disk(s) may completely stop spinning but in other embodiments, the disks may not completely stop spinning before being spun back up or the disks may simply spin much slower instead of being completely stopped.

"Spin-up" refers to the process of turning on the motor that spins the disks. The disks may be spun-up from being completely stopped, from a point where they are still slowing down as a part of a spin-down, or from a slower rate of speed, depending on the embodiment and circumstances. In some embodiments, the spin-up process may also include repositioning the head(s) above the disk surface so that the hard disk drive is once again ready for data to be written to or read from the disk(s).

Hard disk drives may be a large component of the power consumption of some computer systems, especially servers utilizing a large number of hard disk drives. And the largest single contributor to the power used by a hard disk drive is typically the motor spinning the disks. Therefore, one of the most effective methods of saving power in a computer system may be to spin down the hard disk drive. But the hard disk drive may be designed to handle only a certain number of spin-up/spin-down cycles over the lifetime of the motor without compromising reliability. If a computer system is repeatedly spinning-up and spinning-down its hard disk drives, it may be possible that the number of spin-up/spin-down cycles may exceed the number of spin-up/spin-down cycles the motor and bearings are designed to handle over their lifetime. Managing the number of spin-up/spin-down cycles so that a maximum allowable number of spin-up/spin-down cycles is not exceeded may be a way of improving the reliability of the computer system.

Likewise, a hard disk drive may be designed to accommodate a limited number of times of parking the heads before reliability may be compromised. So managing the operations to park the heads so that a maximum allowable number of head parking operations is not exceeded over the lifetime of the hard disk drive may be another way of improving the reliability of the computer system.

As an example, in one embodiment, a hard disk drive may be targeted for 100,000 hours (approximately 11.5 years) of operation. The hard disk drive may have a design lifetime of 400,000 head parking operations and 300,000 spin-up/spin-down cycles. So to increase the reliability of the computer system, it is desirable to not exceed the design lifetimes of the various operations of the hard disk drive.

Reference now is made in detail to the examples illustrated in the accompanying drawings and discussed below.

Figure 1B:
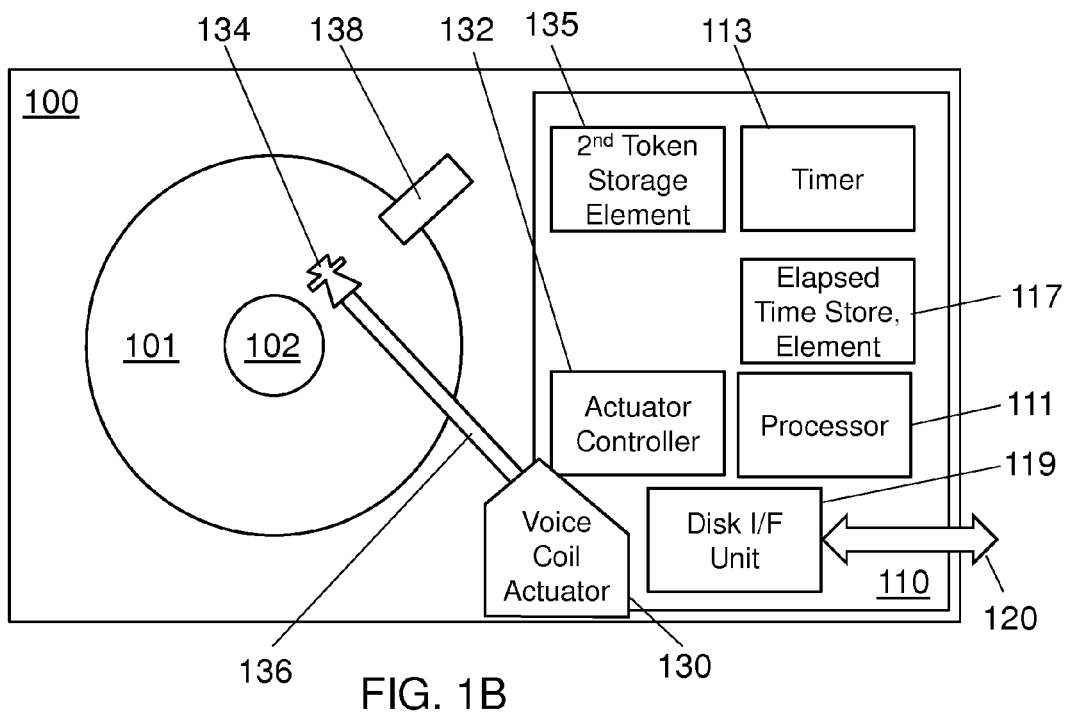

FIG. 1A and FIG. 1B show block diagrams of various aspects of a hard disk drive 100 suitable for various embodiments of managing power. Both diagrams show one or more rotatable disks 101 and a motor 102 for spinning the disks 101. In many embodiments, the disks 101 may be coated with a magnetic material allowing for magnetic storage of data. In other embodiments, the disks may be designed to allow for optical storage of data. Any method may be used to store data on the disks 101. A disk controller 110 may be provided that is capable of controlling the motor 102 and/or the voice coil actuator 130. The disk controller may also include a processor 111 for managing the functionality of the disk controller 110. The processor 111 may include memory for storing program instructions and/or data. Such memory may be volatile or non-volatile and may be integrated into the processor 111 or included as a separate element on the disk controller 110. The processor 111 may be communicatively coupled to a disk interface unit 119 that is configured to communicate over a disk interface 120 such as Serial ATA (SATA), Small Computer Systems Interface (SCSI), Fibre Channel, or other protocol.

The disk controller 100 may also include a timer 113. The timer 113 may provide various functions including, but not limited to providing a notice that a regular amount of time has elapsed. It may also provide a capability of interrupting the processor 111 after a certain interval. It may also provide the ability to update an elapsed time storage element 117 that is readable by the processor 111 and measures an amount of time that has elapsed since the elapsed time storage element 117 was last reset. The elapsed time storage element 117 may also have the capability to interrupt the processor 111 if it exceeds a set amount of time.

FIG. 1A shows elements that could be useful in some embodiments that control the motor 102 of the hard disk drive 100. A motor controller 112 that may be communicatively coupled to the processor 111 is configured to control the motor 102 over link 103. The motor controller 112 may utilize field effect transistors (FETs), bipolar transistors or other electronic devices to control the power to the motor 102 flowing over the link 103. In other embodiments, the motor may have direct power connections and the link 103 may simply provide an on/off indication from the motor controller 112 to the motor 102. In other embodiments, the link 103 may provide additional information such as desired speed or other control information to the motor 102. A $1^{st}$ token storage element 115 may be provided on the disk controller. Note that in some embodiments, the 1st token storage element 115 may not be located on the disk controller and may be provided as a memory location in a host computer or other suitable location. In the embodiment shown in FIG. 1A, however, the $1^{st}$ token storage element 115 is accessible by the processor 111 and may be, in various embodiments, read, written, incremented, decremented, or changed through action of the processor 111 or other elements of the disk controller 110. The contents of the $1^{st}$ token storage element 115 may be accessed by a host computer or other device through the disk interface 120 by sending a command requesting its contents. The processor 111 may respond to such a command by reading the contents of the $1^{st}$ token storage element and providing them back through the disk interface unit 119 to the disk interface 120 in response.

FIG. 1B shows elements that could be useful in other embodiments that control head parking of the hard disk drive 100. An actuator controller 132 that may be communicatively coupled to the processor 111 is configured to control the voice coil actuator 130. The voice coil actuator 130 may move the arm(s) 136 as needed to position the head(s) 134 over the desired portion of the rotatable disk(s) 101. In some situations, the processor 111 may determine to park the heads and communicate with the actuator controller 132 to control the voice coil actuator 130 to move the arm(s) 136 so that the head(s) 134 are moved to a ramp(s) 138. By moving the head(s) 134 to the ramp(s) 138, they may be positioned in such a way that they cannot come in contact with the disk(s) 101, thereby avoiding damage to the disk(s) 101. A $2^{nd}$ token storage element 135 may be provided on the disk controller. Note that in some embodiments, the $2^{nd}$ token storage element 135 may not be located on the disk controller and may be provided as a memory location in a host computer or other suitable location. In the embodiment shown in FIG. 1B, however, the $2^{nd}$ token storage element 135 is accessible by the processor 111 and may be, in various embodiments, read, written, incremented, decremented, or changed through action of the processor 111 or other elements of the disk controller 110. The contents of the $2^{nd}$ token storage element 135 may be accessed by a host computer or other device through the disk interface 120 by sending a command requesting its contents. The processor 111 may respond to such a command by reading the contents of the $2^{nd}$ token storage element and providing them back through the disk interface unit 119 to the disk interface 120 in response.

Commands may be sent to the disk controller 110 over the disk interface 120 from a computer system or other device. The commands may be writes or reads of data or other commands including power management commands. Some power management commands may request that the hard disk drive 100 be put into a low power state. Different low power states may be supported in various embodiments. Some embodiments may only provide for a single low power state in addition to the operating state. Other embodiments, may provide for a plurality of low power states in addition to the operating state. Some low power states that may be provided in various embodiments include, but are not limited to, (a) putting at least some portions of the disk controller 110 electronics into a low power state using such techniques as halting the clock on the processor 111, (b) parking the head(s) 134 on the ramp(s) 138, (c) turning off the motor 102 to allow the disk(s) 101 to stop spinning, (d) slowing the rate of spin of the disk(s) 101 but keeping them spinning fast enough to allow the head(s) 134 to continue to "fly" over the disk(s) 101, (e) disabling various portions of the disk controller 110 such as a data cache, or combinations of techniques (a)-(e). A low power transition occurs when a disk drive enters a low power state. A low power transition may be associated with a resource such as the motor 102 or the head(s) 134 that may be affected by the particular low power state. A particular type of low power transition is a transition to a low power state that affects a particular resource. The $1^{st}$ token storage element 112 and/or $2^{nd}$ token storage element 135 may be used to maintain a token value linked to a resource of the hard disk drive 100 based on an allowable number of low power transitions of that resource of the hard disk drive 100 compared to an actual number of low power transitions of that resource of the hard disk drive 100. A token may therefore be linked to a particular type of low power transition that affects a particular resource.

Figure 2A:
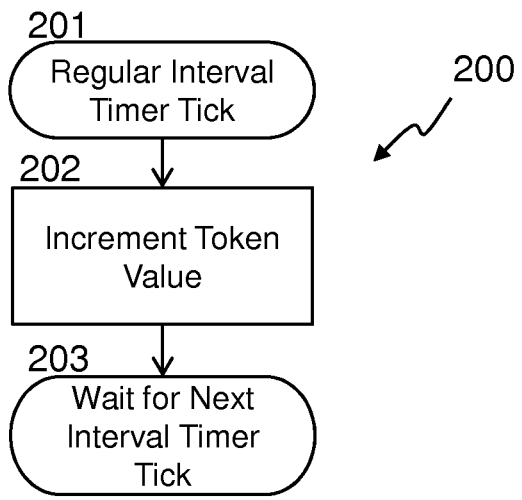
FIG. 2A-C are flow charts of several aspects of various embodiments of managing power in a hard disk drive.
Figure 2B:
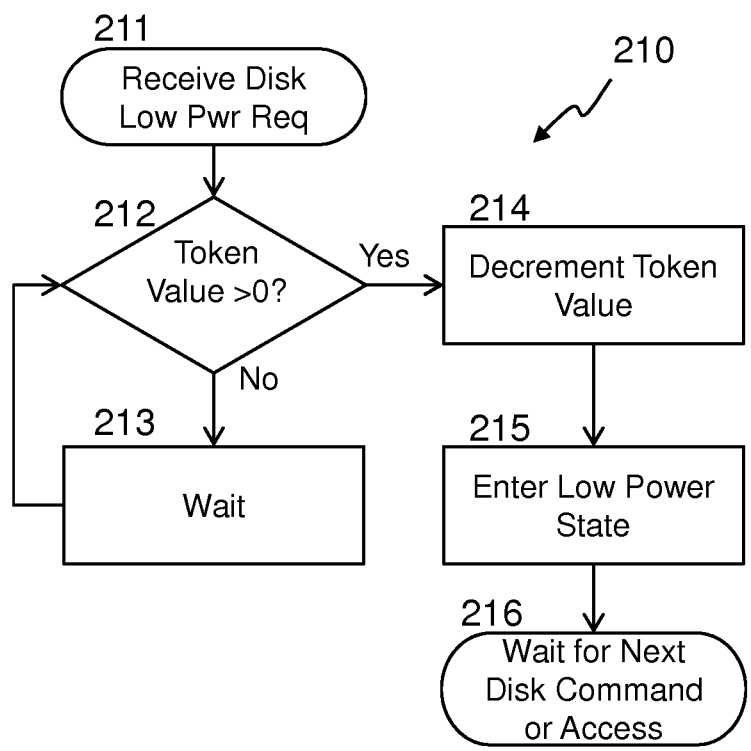
Figure 2C:
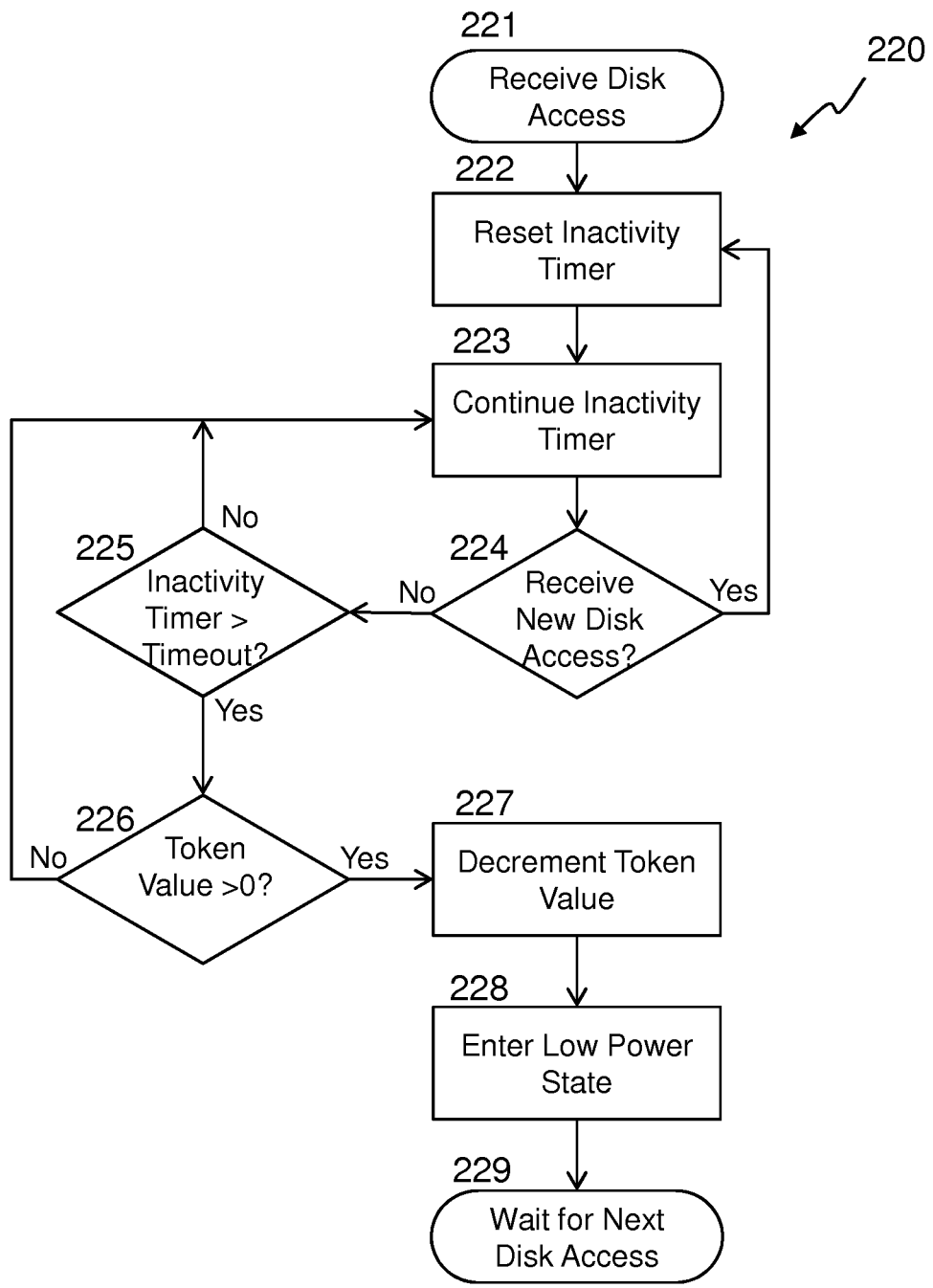

FIG. 2A-C are flow charts 200, 210, 220 of several aspects of various embodiments of managing power in a hard disk drive 100. Various embodiments may implement one or more of the methods shown in the flow charts 200, 210, 220. The methods may run simultaneously, serially, or may be interleaved in some fashion. The methods described above in FIG. 2A-2C may be used to ensure that a particular hard disk drive does not exceed an allowable number of power management transitions during its lifetime. In some embodiments, one token may be used to represent multiple drives that are managed as a group, such as a RAID set of hard disk drives.

FIG. 2A shows a flow chart 200 of incrementing a token value at a time interval. In one embodiment, the timer 113 may generate a timer tick at block 201 of the flow chart 200. The timer tick may be used to increment one or both tokens, or a field of the token(s) at block 202. The method then waits for the next timer tick at block 203.

The timer 113 may be set up so that the timer ticks may only occur when the hard disk drive 100 is powered and capable of being operational. In some embodiments, this may include time that the drive is in a low power state but other embodiments may disable the timer 113 in certain low power states. In other embodiments, the timer 113 may run at all times, running on battery power even when the hard disk drive 100 is not connected to power. In some embodiments the token storage element(s) 115, 135 may be directly incremented by the timer ticks, but in other embodiments, the processor 111 may receive the timer ticks from the timer 113 prompting the processor 111 to increment the token storage element(s) 115, 135. In embodiments that implement one or both of the token storage elements 115, 135 outside of the disk interface 110, other methods may be used to maintain the token storage element(s) 115, 135. For example if the token storage element(s) 115, 135 are implemented in memory of a host computer system, a hardware timer of the host computer and/or operating system functions may be used by the CPU of that host computer system, allowing it to increment the token storage element(s) 115, 135 at appropriate intervals. Incrementing the token value(s) represents the increasing number of power management transitions that may be allowed given the increasing time that the hard drive 110 has been used.

The timer tick interval may be set using information about the hard disk drive 100 such as an expected operating lifetime and a design lifetime for head parking operations and/or spin-up/spin-down operations. So for example, if the expected operating lifetime of the hard disk drive 100 is 100,000 hours (approximately 11.5 years) and it has a design lifetime of 400,000 head parking operations and 300,000 spin-up/spin-down cycles, the $1^{st}$ token storage element 115 may be incremented at a target interval of 20 minutes (100,000 hrs/300,000) and the $2^{nd}$ token storage element 135 may be incremented at a target interval of 15 minutes (100,000 hrs/400,000). The interval of time used may be calculated using specifications of a particular hard disk drive 100, chosen based on field reliability data, defined based on engineering judgment, or determined in any other way. In some embodiments, the interval of time may not be exactly the same for each increment for a variety of reasons. For the purposes of the specification and claims of this disclosure, a time interval may vary widely. The time for any particular interval is unimportant as long as the average interval over a long period of time is basically consistent with the target interval.

FIG. 2B shows a flow chart 210 for a method of managing whether a hard disk drive 100 may enter a low power state when such a transition is requested. A request to enter a low power state is received by the hard disk drive 100 at block 211. The hard disk drive 100 may then evaluate one or more token values tied to the resources that might be impacted by the transitioning to the requested low power state at block 212. In some embodiments, the low power state may require parking the head(s) 134 of the hard disk drive 100. In other embodiments, the low power state may require spinning-down the disk(s) 101 of the hard disk drive 100. Yet other embodiments may impact other resources or may require multiple resources (such as both parking the head(s) 134 and spinning-down the disk(s) 101). The token values may be evaluated in several different ways in different embodiments. In some embodiments, there is a single token value for a given resource. To evaluate the single token, its value may be compared against a predetermined value such as zero (0). In other embodiments, the predetermined value may be a negative to allow some number of power management transitions to be "borrowed" against a future allotment of power management transitions. In other embodiments, the predetermined value may be greater than zero. In other embodiments, two fields may be maintained in each token with one field being incremented by the timer ticks and representing a total number of power management transitions allowed for the given resource at any particular time during its lifetime and the other field incremented each time that the power management transition is actually performed for that resource, representing the total number of power management transitions that have occurred for that resource. In that embodiment, the token is evaluated by determining the difference between the two fields and comparing that to a predetermined value, such as zero (0) or other values similar to those described above for a single value token. In some embodiments, the predetermined value may vary over time. This may be done to affect the likelihood of the resource being allowed to perform a power management transition. In one embodiment, the predetermined value may be equal to −100 during the nighttime hours and +100 during the daylight hours. Note that changing the predetermined value has no significant long term impact on the accumulated power management transitions as long as it does not increase or decrease without limit over time.

If the token evaluates to show that no power management transition is currently allowable for that resource, represented by the token not being greater than zero in block 212, various embodiments may take different actions. In the embodiment shown in flow chart 210, the method waits in block 213 for some period of time and then re-evaluates the token again at block 212, effectively delaying the power management transition until the token has been incremented by the method of flow chart 200 to a point to allow the power management transition to occur. In other embodiments, the request to enter the low power state may be responded to with an error message without transitioning to the low power state and in other embodiments, the request may simply be ignored.

If the token evaluates to show that a power management transition is currently allowed for that resource, represented by the token being greater than zero in block 212, the token is decremented at block 214 (or the second field of the two-field token incremented) and the associated resource is allowed to enter the low power state at block 215. The hard disk drive 100 may then wait for the next command or access over the disk interface 120 at block 216. Depending on the next command or access, the hard disk drive 100 may return the resource to its full operating state. As described above, resources that may be utilized for power management and may be associated with a token include, inter alia, parking the head(s) 134 and turning off the motor 102.

In some embodiments the methods shown in FIGS. 2A and 2B may both be implemented in the hard disk drive 100. In other embodiments, the method shown in flow chart 200 may be implemented in the hard disk drive 100 and the method shown in flow chart 210 may be implemented using software running on the host computer. In other embodiments, both methods may be implemented using software running on the host computer communicating with the hard disk drive 100 over the disk interface 120.

FIG. 2C shows a flow chart 220 of a method of managing a power management transition based on an inactivity timer. If a disk access is received over the disk interface 120 at block 221, an inactivity timer may be reset at block 222. The inactivity timer may be implemented using the elapsed time storage element 117 in some embodiments and may be implemented in software running on the host computer in other embodiments. The inactivity timer may continue to measure elapsed time in block 223 until a new disk access is received at block 224 or the inactivity timer exceeds a timeout value at block 225. If a new disk access is received at block 224, the inactivity timer is reset again at block 222 and allowed to measure a new period of inactivity at block 223. If the inactivity exceeds the timeout value at block 225, the token associated with a resource to be used for a low power state is checked against a predetermined value at block 226 in a similar way to that done for the method of FIG. 2B. If the token evaluates to indicate that no power management transition is currently allowed for the resource at block 226, the inactivity timer may continue to increase until either a new disk access is received at block 224 causing the inactivity timer to be reset at block 222, or the token value evaluates to allow a power management transition at block 226. If the power management transition is allowed, the token value may be decremented (or the second field incremented) at block 227 and the hard disk drive 110 put into a low power state at block 228. The method then waits for the next disk access at block 229. The method of FIG. 2C may be implemented completely in the hard disk drive 100 or in software running on a host computer, or with elements running on each.

Note that these methods describe above in FIG. 2A-2C do not provide for a minimum or maximum rate of power management transitions, although some embodiments may also provide for a minimum time between power management transitions, such as a minimum time between head parking, a minimum time between spin-downs, a minimum time between a spin-up and a spin-down (minimum time spun-up), and/or a minimum time between a spin-down and a spin-up (minimum time spun-down). The methods described allow a surplus of power management transitions to build up that then may be used up at a faster rate later. For example, looking only at the spin down example discussed above, where the spin-down token value is incremented every 20 minutes, if a drive is put into service and, for the first 30 days, it is in near constant use for 12 hours per day and then spun-down and unused for 12 hours per day so that only one spin-down per day is performed, the token value will increase by 3*24−1=71 per day and would have a value of 2201 at the start of the 31$^{st}$ day.

If, starting on the 31$^{st}$ day, the usage pattern or power management policy changes, and the host computer using that drive starts attempting to spin-down the hard disk drive for 1 minute and then spinning-up the drive and using it for 1 minute, decrementing the token every 2 minutes, that pattern could continue for over 3 days as shown in the following calculations. After 2201*2=4402 minutes (73.36 hrs) the token value is at 73.36*3=220 based on the token increments that took place during the first 4402 minutes allowing at least another 440 minutes of similar operations. After another 440 minutes of the same one minute spun-up, one minute spun down pattern, the token value would be 22, and after another 44 minutes, the token value would be 2 allowing for another 4 minutes of that usage pattern before the token value would be equal to zero. So after 30 days of 12 hours spun-up, 12 hours spun down, the hard disk drive could then perform one minute spun-up, one minute spun-down operation for 4890 minutes (3 days, 9.5 hours).

If the operating system continues to attempt to operate the hard disk drive in the one minute spun-up, one minute spun-down mode of operation, the token value of zero means that the hard disk drive might wait for the next token increment before spinning down, aborting the wait when the next drive access occurs. So the hard disk drive only responds to the spin-down command once every 20 minutes, and then spins-up the hard disk drive after one minute when it is accessed again, leading to a pattern of one minute spun-down, nineteen (19) minutes spun-up, even though the operating system may still be attempting to operate the hard disk drive as one minute spun-up, one minute spun-down.

Figure 3:
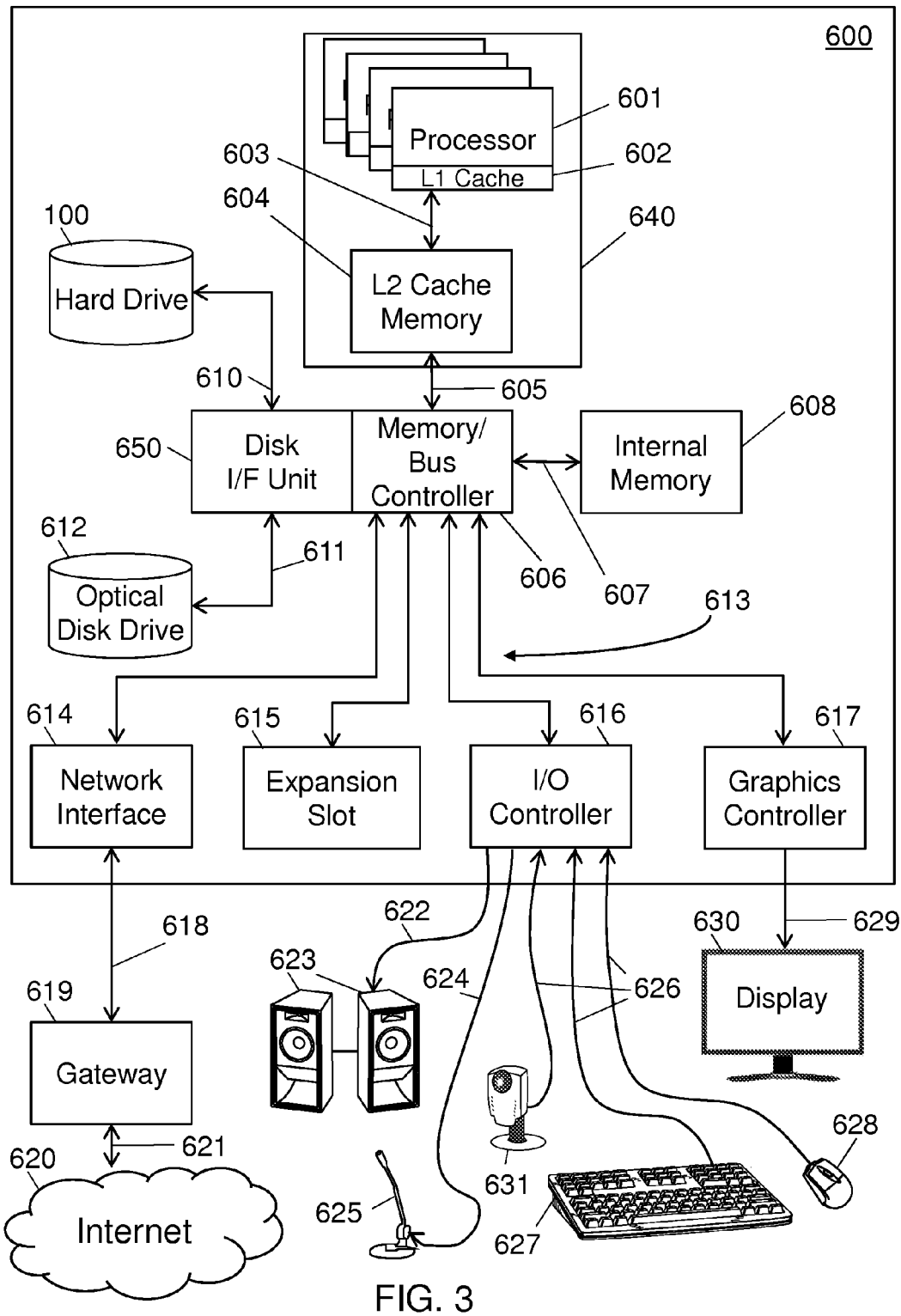
FIG. 3 is a block diagram of a system suitable for various embodiments of managing power in a hard disk drive.

FIG. 3 depicts details of a computer system 600 suitable for implementing various embodiments. The computer system 600 may be configured in the form of a desktop computer, a laptop computer, a mainframe computer, or any other hardware or logic arrangement capable of being programmed or configured to carry out instructions. In some embodiments the computer system 600 may act as a server, accepting inputs from a remote user over a local area network (LAN) 618 or the internet 620. In other embodiments, the computer system 600 may function as a smart user interface device for a server on a LAN 618 or over the internet 620. The computer system 600 may be located and interconnected in one location, or may be distributed in various locations and interconnected via communication links such as a LAN 618 or a wide area network (WAN), via the Internet 620, via the public switched telephone network (PSTN), a switching network, a cellular telephone network, a wireless link, or other such communication links. Other devices may also be suitable for implementing or practicing the embodiments, or a portion of the embodiments. Such devices include personal digital assistants (PDA), wireless handsets (e.g., a cellular telephone or pager), and other such electronic devices preferably capable of being programmed to carry out instructions or routines. One skilled in the art may recognize that many different architectures may be suitable for the computer system 600, but only one typical architecture is depicted in FIG. 3.

Computer system 600 may include a processor 601 which may be embodied as a microprocessor, two or more parallel processors as shown in FIG. 3, a central processing unit (CPU) or other such control logic or circuitry. The processor 601 may be configured to access a local cache memory 602, and send requests for data that are not found in the local cache memory 602 across a cache bus 604 to a second level cache memory 604. Some embodiments may integrate the processor 601, and the local cache 602 onto a single integrated circuit and other embodiments may utilize a single level cache memory or no cache memory at all. Other embodiments may integrate multiple processors 601 onto a single die and/or into a single package. Yet other embodiments may integrate multiple processors 601 with multiple local cache memories 602 with a second level cache memory 604 into a single package 640 with a front side bus 605 to communicate to a memory/bus controller 606. The memory/bus controller 606 may accept accesses from the processor(s) 601 and direct them to either the internal memory 608 or to the various input/output (I/O) busses 120, 611, 613. A disk interface unit 650 may connect to the disk interface 120, to the hard disk drive 100 and/or or other communication link 611 to the optical disks 612 and may be integrated into the memory/bus controller 606 or may be a separate chip. Some embodiments of the computer system 600 may include multiple processor packages 640 sharing the front-side bus 605 to the memory/bus controller. Other embodiments may have multiple processor packages 640 with independent front-side bus connections to the memory/bus controller. The memory bus controller may communicate with the internal memory 608 using a memory bus 607. The internal memory 608 may include one or more of random access memory (RAM) devices such as synchronous dynamic random access memories (SDRAM), double data rate (DDR) memories, or other volatile random access memories. The internal memory 608 may also include non-volatile memories such as electrically erasable/programmable read-only memory (EEPROM), NAND flash memory, NOR flash memory, programmable read-only memory (PROM), read-only memory (ROM), battery backed-up RAM, or other non-volatile memories. In some embodiments, the computer system 600 may also include 3rd level cache memory or a combination of these or other like types of circuitry configured to store information in a retrievable format. In some implementations the internal memory 608 may be configured as part of the processor 601, or alternatively, may be configured separate from it but within the same package 640. The processor 601 may be able to access internal memory 608 via a different bus or control lines than is used to access the other components of computer system 600.

The computer system 600 may also include, or have access to, one or more hard disk drives 100 (or other types of storage memory) and optical disk drives 612. Hard disk drives 100 and the optical disks for optical disk drives 612 are examples of machine readable (also called computer readable) mediums suitable for storing the final or interim results of the various embodiments. The optical disk drives 612 may include a combination of several disc drives of various formats that can read and/or write to removable storage media (e.g., CD-R, CD-RW, DVD, DVD-R, DVD-W, DVD-RW, HD-DVD, Blu-Ray, and the like). Other forms or computer readable media that may be included in some embodiments of computer system 600 include, but are not limited to, floppy disk drives, 9-track tape drives, tape cartridge drives, solid-state drives, cassette tape recorders, paper tape readers, bubble memory devices, magnetic strip readers, punch card readers or any other type or computer useable storage medium. The computer system 600 may either include the hard disk drives 100 and optical disk drives 612 as an integral part of the computer system 600 (e.g., within the same cabinet or enclosure and/or using the same power supply), as connected peripherals, or may access the hard disk drives 100 and optical disk drives 100 over a network, or a combination of these. The hard disk drive 100 often includes a rotating magnetic medium configured for the storage and retrieval of data, computer programs or other information. The hard disk drive 100 also often includes a disk controller capable of controlling the motor to rotate the storage medium as well as access the data on the medium. In some embodiments, an additional drive may be a solid state drive using semiconductor memories. In other embodiments, some other type of computer useable medium may be used. The hard disk drive 100 need not necessarily be contained within the computer system 600. For example, in some embodiments the hard disk drive 100 may be server storage space within a network that is accessible to the computer system 600 for the storage and retrieval of data, computer programs or other information. In some instances the computer system 600 may use storage space at a server storage farm, or like type of storage facility, that is accessible by the Internet 620 or other communications lines. The hard disk drive 100 is often used to store the software, instructions and programs executed by the computer system 600, including for example, all or parts of the computer application program for carrying out activities of the various embodiments.

The disk interface 120 and/or communication link 611 may be used to access the contents of the hard disk drives 100 and optical disk drives 612. These interfaces/links 120, 611 may be point-to-point links such as Serial Advanced Technology Attachment (SATA) or a bus type connection such as Parallel Advanced Technology Attachment (PATA) or Small Computer System Interface (SCSI), a daisy chained topology such as IEEE-1394, a link supporting various topologies such as Fibre Channel, or any other computer communication protocol, standard or proprietary, that may be used for communication to computer readable medium. The memory/bus controller may also provide other I/O communication links 613. In some embodiments, the links 613 may be a shared bus architecture such as peripheral component interface (PCI), microchannel, industry standard architecture (ISA) bus, extended industry standard architecture (EISA) bus, VERSAmodule Eurocard (VME) bus, or any other shared computer bus. In other embodiments, the links 613 may be a point-to-point link such as PCI-Express, HyperTransport, or any other point-to-point I/O link. Various I/O devices may be configured as a part of the computer system 600. In many embodiments, a network interface 614 may be included to allow the computer system 600 to connect to a network 618. The network 618 may be an IEEE 802.3 ethernet network, an IEEE 802.11 Wi-Fi wireless network, or any other type of computer network including, but not limited to, LANs, WAN, personal area networks (PAN), wired networks, radio frequency networks, powerline networks, and optical networks. A network gateway 619 or router, which may be a separate component from the computer system 600 or may be included as an integral part of the computer system 600, may be connected to the network 618 to allow the computer system 600 to communicate with the internet 620 over an internet connection 621 such as an asymmetric digital subscriber line (ADSL), data over cable service interface specification (DOCSIS) link, T1 or other internet connection mechanism. In other embodiments, the computer system 600 may have a direct connection to the internet 620. In some embodiments, an expansion slot 615 may be included to allow a user to add additional functionality to the computer system 600.

The computer system 600 may include an I/O controller 616 providing access to external communication interfaces such as universal serial bus (USB) connections 626, serial ports such as RS-232, parallel ports, audio in 624 and audio out 622 connections, the high performance serial bus IEEE-1394 and/or other communication links. These connections may also have separate circuitry in some embodiments, or may be connected through a bridge to another computer communication link provided by the I/O controller 616. A graphics controller 617 may also be provided to allow applications running on the processor 601 to display information to a user. The graphics controller 617 may output video through a video port 629 that may utilize a standard or proprietary format such as an analog video graphic array (VGA) connection, a digital video interface (DVI), a digital high definition multimedia interface (HDMI) connection, or any other video connection. The video connection 629 may connect to display 630 to present the video information to the user. The display 630 may be any of several types of displays, including a liquid crystal display (LCD), a cathode ray tube (CRT) monitor, on organic light emitting diode (OLED) array, or other type of display suitable for displaying information for the user. The display 630 may include one or more light emitting diode (LED) indicator lights, or other such display devices. Typically, the computer system 600 includes one or more user input/output (I/O) devices such as a keyboard 627, mouse 628, and/or other means of controlling the cursor represented including but not limited to a touchscreen, touchpad, joystick, trackball, tablet, or other device. The user I/O devices may connect to the computer system 600 using USB 626 interfaces or other connections such as RS-232, PS/2 connector or other interfaces. Some embodiments may include webcam 631 which may connect using USB 626, a microphone 625 connected to an audio input connection 624 and/or speakers 623 connected to an audio output connection 622. The keyboard 627 and mouse 628, speakers 623, microphone 625, webcam 631, and monitor 630 may be used in various combinations, or separately, as means for presenting information to the user and/or receiving information and other inputs from a user to be used in carrying out various programs and calculations. Speech recognition software may be used in conjunction with the microphone 625 to receive and interpret user speech commands.

The computer system 600 may be suitable for embodiments to manage power of a hard disk drive 100. For example, the processor 601 may be embodied as a microprocessor, microcontroller, DSP, RISC processor, two or more parallel processors, or any other type of processing unit that one of ordinary skill would recognize as being capable of performing or controlling the functions, activities and methods described herein. A processing unit in accordance with at least one of the various embodiments can operate computer software programs stored (embodied) on computer-readable medium such those compatible with the disk drives 100, the optical disk drive 612 or any other type of hard disk drive, floppy disk, flash memory, ram, or other computer readable medium as recognized by those of ordinary skill in the art.

As will be appreciated by those of ordinary skill in the art, aspects of the various embodiments may be embodied as a system, method or computer program product. Accordingly, aspects of the present invention may take the form of an entirely hardware embodiment, an entirely software embodiment (including firmware, resident software, micro-code, or the like) or an embodiment combining software and hardware aspects that may all generally be referred to herein as a "circuit," "module," "hard disk drive," "logic" or "system." Furthermore, aspects of the various embodiments may take the form of a computer program product embodied in one or more computer readable medium(s) having computer readable program code stored thereon.

Any combination of one or more computer readable medium(s) may be utilized. The computer readable medium is typically a computer readable storage medium. A computer readable storage medium may be embodied as, for example, an electronic, magnetic, optical, electromagnetic, infrared, or semiconductor system, apparatus, or device, or other like storage devices known to those of ordinary skill in the art, or any suitable combination of the foregoing. Examples of such computer readable storage medium include the following: a portable computer diskette, a hard disk drive, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of various embodiments may be written in any combination of one or more programming languages, including an object oriented programming language such as Java, Smalltalk, C++, or the like, and conventional procedural programming languages, such as the "C" programming language or similar programming languages. In accordance with various implementations, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the figures help to illustrate the architecture, functionality, and operation of possible implementations of systems, methods and computer program products of various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes," and/or "including" used in this specification specify the presence of stated features, integers, steps, operations, elements, and/or components, but do not preclude the presence or addition of one or more other features, integers, steps, operations, elements, components, and/or groups thereof. As used herein, the term "coupled" includes direct and indirect connections. Moreover, where first and second devices are coupled, intervening devices including active devices may be located there between.

The corresponding structures, materials, acts, and equivalents of all means or step plus function elements in the claims below are intended to include any structure, material, or act for performing the function in combination with other claimed elements as specifically claimed. The description of the various embodiments has been presented for purposes of illustration and description, but is not intended to be exhaustive or to limit the invention to the forms disclosed. Many modifications and variations will be apparent to those of ordinary skill in the art without departing from the scope and gist of the invention. The various embodiments included herein were chosen and described in order to best explain the principles of the invention and the practical application, and to enable others of ordinary skill in the art to understand the invention for various embodiments with various modifications as are suited to the particular use contemplated.

What is claimed is:

1. A method for managing power consumed by a hard disk drive, the method comprising:
    maintaining a token value based on an allowable number of low power transitions of a hard disk drive compared to an actual number of low power transitions of said hard disk drive, wherein the allowable number of low power transitions increases over the hard disk drive's lifetime;
    determining that said hard disk drive should be put into a low power state to conserve power;
    evaluating said token value to determine if said hard disk drive is allowed to perform a low power transition; and
    performing the low power transition of said hard disk drive if said token value evaluates to allow the low power transition of said hard disk drive.

2. The method of claim 1, wherein the low power transition comprises:
    spinning-down said hard disk drive.

3. The method of claim 1, wherein the low power transition comprises:
    Parking a head of said hard disk drive.

4. The method of claim 1, wherein the maintaining of said token value comprises:
    incrementing said token value at intervals of time; and
    decrementing said token value at a time associated with performing the low power transition of said hard disk drive.

5. The method of claim 4, wherein the evaluating of said token value comprises:
    determining that the low power transition is allowable for said hard disk drive if said token value is greater than a predetermined value.

6. The method of claim 5, wherein the predetermined value is zero.

7. The method of claim 1, further comprising:
    waiting for said token value to evaluate to allow said hard disk drive to perform the low power transition before performing the low power transition of said hard disk drive.

8. The method of claim 1, wherein the maintaining of the token value comprises:
    incrementing a first field of said token value at intervals of time; and
    incrementing a second field of said token value at a time associated with performing the low power transition of said hard disk drive.

9. The method of claim 8, wherein the evaluating of said token value comprises:
    determining that the low power transition is allowable for said hard disk drive if the first field of said token value is greater than the second field of said token value by at least a predetermined value.

10. The method of claim 1, further comprising:
    maintaining a timer since a last power management transition; and
    waiting for said timer to exceed a predetermined amount of time before performing the low power transition of said hard disk drive.

11. The method of claim 1, further comprising:
    storing the token value in a token storage element;
    receiving a request for the token value in the token storage element; and
    providing said token value stored in the token storage element in response to the request.

12. The method of claim 11, wherein a disk controller comprises the token storage element, the method further comprising:
    receiving a request to put the disk drive into a low power state;
    making a determination that said value stored in the token storage element is greater than a predetermined value; and
    decrement the value stored in the token storage element and put the disk drive into the low power state in response to the determination that said value stored in the token storage element is greater than the predetermined value.

13. The method of claim 11, wherein a disk controller comprises the token storage element, the method further comprising:
    receiving a request to put the disk drive into a low power state;
    making a determination that said value stored in the token storage element is not greater than a predetermined value; and
    delaying the disk drive from being entered into the low power state in response to the determination that said value stored in the token storage element is not greater than the predetermined value.

14. The method of claim 1, further comprising:

measuring an elapsed time since a last disk access command was received;

making a determination that said elapsed time exceeds a predetermined elapsed time and said value stored in the token storage element is greater than a predetermined value; and decrementing said value stored in the token storage element and putting the data storage device into the low power state in response to said determination.

* * * * *